US012600410B2

(12) United States Patent
Lett et al.

(10) Patent No.: US 12,600,410 B2
(45) Date of Patent: Apr. 14, 2026

(54) VEHICLE SUBFRAME

(71) Applicant: Rivian IP Holdings, LLC, Plymouth, MI (US)

(72) Inventors: Barry Lett, Woking (GB); Christophe Sartiaux, Long Beach, CA (US); Allen Martin Orchard, Shepperton (GB)

(73) Assignee: Rivian IP Holdings, LLC, Irvine, CA (US)

( * ) Notice: Subject to any disclaimer, the term of this patent is extended or adjusted under 35 U.S.C. 154(b) by 370 days.

(21) Appl. No.: 18/182,671

(22) Filed: Mar. 13, 2023

(65) Prior Publication Data

US 2024/0253703 A1     Aug. 1, 2024

Related U.S. Application Data

(60) Provisional application No. 63/481,819, filed on Jan. 27, 2023.

(51) Int. Cl.
B62D 21/15          (2006.01)
B60K 1/04           (2019.01)

(52) U.S. Cl.
CPC ........... B62D 21/15 (2013.01); B62D 21/155 (2013.01); B60K 1/04 (2013.01)

(58) Field of Classification Search
CPC .... B62D 21/15; B62D 21/152; B62D 21/155; B60K 1/04
See application file for complete search history.

(56) References Cited

U.S. PATENT DOCUMENTS

| | | | | |
|---|---|---|---|---|
| 5,251,911 A | * | 10/1993 | Blake | B62D 39/00 |
| | | | | 180/274 |
| 5,738,378 A | * | 4/1998 | Yazejian | B62D 39/00 |
| | | | | 180/232 |
| 12,403,770 B2 | * | 9/2025 | Jo | B62D 25/20 |
| 2001/0054521 A1 | * | 12/2001 | Hawener | B62D 21/155 |
| | | | | 180/232 |
| 2019/0176891 A1 | * | 6/2019 | Sawatzki | B62D 21/11 |
| 2019/0322164 A1 | * | 10/2019 | Sasaki | B62D 21/155 |

FOREIGN PATENT DOCUMENTS

| | | | |
|---|---|---|---|
| DE | 10 2008 015 182 A1 | 9/2009 | |
| DE | 11 2011 104 032 T5 | 8/2013 | |
| DE | 11 2013 001 681 T5 | 1/2015 | |
| DE | 10 2015 209 031 A1 | 11/2016 | |
| DE | 10 2015 210 293 A1 | 12/2016 | |
| DE | 10 2018 104 583 A1 | 10/2018 | |
| DE | 10 2019 200 818 A1 | 7/2020 | |
| DE | 11 2017 008 006 T5 | 7/2020 | |
| DE | 102020124599 A1 * | 3/2022 | ............. B62D 21/15 |

OTHER PUBLICATIONS

DE Office Action on Appl. No. 102024101784.8 dated Mar. 4, 2026, with machine translation.

* cited by examiner

*Primary Examiner* — Daniel J Colilla
(74) *Attorney, Agent, or Firm* — Foley & Lardner LLP

(57)          ABSTRACT

A system can include a subframe section having a first subframe portion and a second subframe portion. The second subframe portion can couple with the first subframe portion at an angled interface having an angle relative to a horizontal plane. The angled interface can decouple the first subframe portion from the second subframe portion and cause the first subframe portion to move in a direction towards the second subframe portion based on the angle of the angled interface in response to a threshold force applied to the first subframe portion.

20 Claims, 10 Drawing Sheets

1000

1005 — Provide system

VEHICLE SUBFRAME

CROSS-REFERENCE TO RELATED PATENT APPLICATIONS

This application claims the benefit of and priority to U.S. Provisional Patent Application No. 63/481,819, filed on Jan. 27, 2023, the entirety of which is incorporated by reference herein.

INTRODUCTION

Electric vehicles (EVs) can include various electrical and mechanical components to produce motion. The design of these components can affect the performance of the vehicle.

SUMMARY

A vehicle front subframe system can allow two portions of the subframe to decouple when a threshold force is applied. The subframe system can include a first subframe portion and a second subframe portion that can couple with one another through an interface (e.g., a joint). When a threshold force is applied to the first subframe portion, the interface can break and an angle of an interface of the interface can cause the first subframe portion to move underneath the second subframe portion to cause the second subframe portion to at least partially overlap the first subframe portion. The length of the front subframe section therefore can decrease when a threshold force is applied to the front subframe section which can cause various portions of the vehicle to move or rotate to reduce the amount and position of rigid components at or near the front of the vehicle or the rear of the vehicle. The movement can also facilitate directing one or more components away from a battery pack of the vehicle to reduce an amount of force applied to the battery pack.

At least one aspect is directed to a system. The system can include a subframe section having a first subframe portion and a second subframe portion. The second subframe portion can couple with the first subframe portion at an angled interface having an angle relative to a horizontal plane. The angled interface can decouple the first subframe portion from the second subframe portion and cause the first subframe portion to move in a direction towards the second subframe portion based on the angle of the angled interface in response to a threshold force applied to the first subframe portion.

At least one aspect is directed to an electric vehicle. The electric vehicle can include a subframe section having a first subframe portion and a second subframe portion. The second subframe portion can couple with the first subframe portion at an angled interface having an angle relative to a horizontal plane. The angled interface can decouple the first subframe portion from the second subframe portion and cause the first subframe portion to move in a direction towards the second subframe portion based on the angle of the angled interface in response to a threshold force applied to the first subframe portion.

At least one aspect is directed to a method. The method can include coupling a first subframe portion of a subframe section with a second subframe portion of the subframe section at an angled interface having an angle relative to a horizontal plane. The method can include decoupling the first subframe portion from the second subframe portion at the angled interface in response to a threshold force applied to the first subframe portion. The method can include causing the first subframe portion to move in a direction towards the second subframe portion based on the angle of the angled interface in response to the threshold force applied to the first subframe portion.

At least one aspect is directed to a method. The method can include providing a system. The system can include a subframe section having a first subframe portion and a second subframe portion. The second subframe portion can couple with the first subframe portion at an angled interface having an angle relative to a horizontal plane. The angled interface can decouple the first subframe portion from the second subframe portion and cause the first subframe portion to move in a direction towards the second subframe portion based on the angle of the angled interface in response to a threshold force applied to the first subframe portion.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of providing a front vehicle subframe section that can separate at least at one portion when a threshold force is applied. The various concepts introduced above and discussed in greater detail below may be implemented in any of numerous ways.

The present disclosure is directed to systems and methods of providing a front vehicle subframe system that allows two portions of the front subframe section of the vehicle to separate when a threshold force is applied to a front portion of the front subframe section such that the overall length of the front subframe section is compressed and therefore decreases. For example, the subframe system can include a first subframe portion and a second subframe portion that can couple with one another through an interface/joint (e.g., a set of components that couple the portions together at a sloping interface). When a threshold force is applied to the first subframe portion, a portion of the interface can yield (e.g., break, decouple, or separate) and the angle of the interface can cause the first subframe portion to decouple from the second subframe portion and move underneath the second subframe portion to cause the second subframe portion to partially overlap the first subframe portion.

The disclosed solutions have a technical advantage of compressing a length of the subframe when a threshold force is applied to the subframe and facilitating causing various portions of the vehicle to move or rotate to reduce the amount and position of rigid components at or near the front of the vehicle or the rear of the vehicle. The movement can also facilitate directing one or more components away from a battery pack of the vehicle to reduce an amount of force applied to the battery pack.

Figure 1:
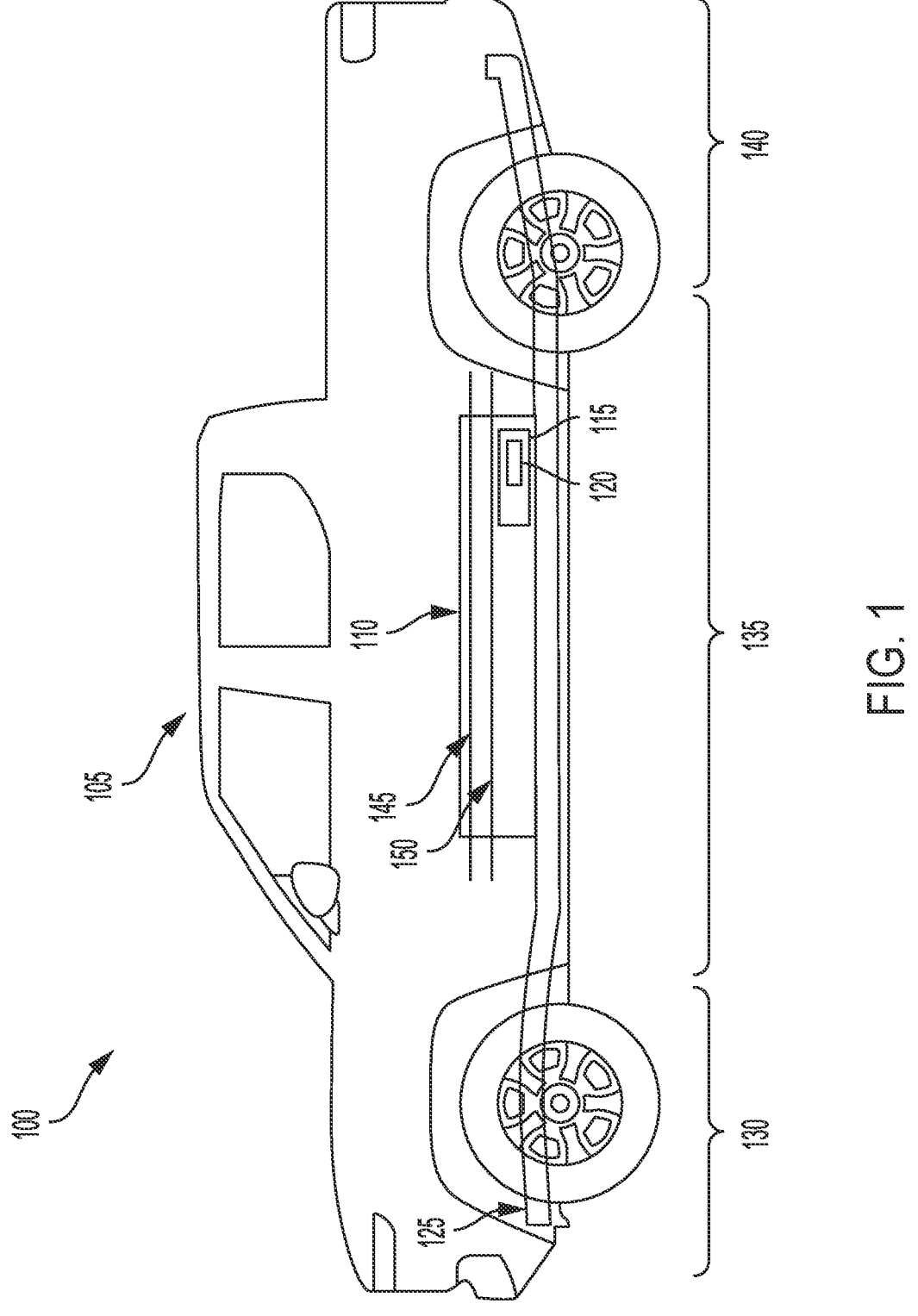
FIG. 1 depicts an example side view of an electric vehicle, in accordance with implementations.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, batteries 115 or battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery 110, the battery modules 115, or the battery cells 120 with other electrical components of the electric vehicle 105 to provide electrical power to various systems or components of the electric vehicle 105.

Figure 2:
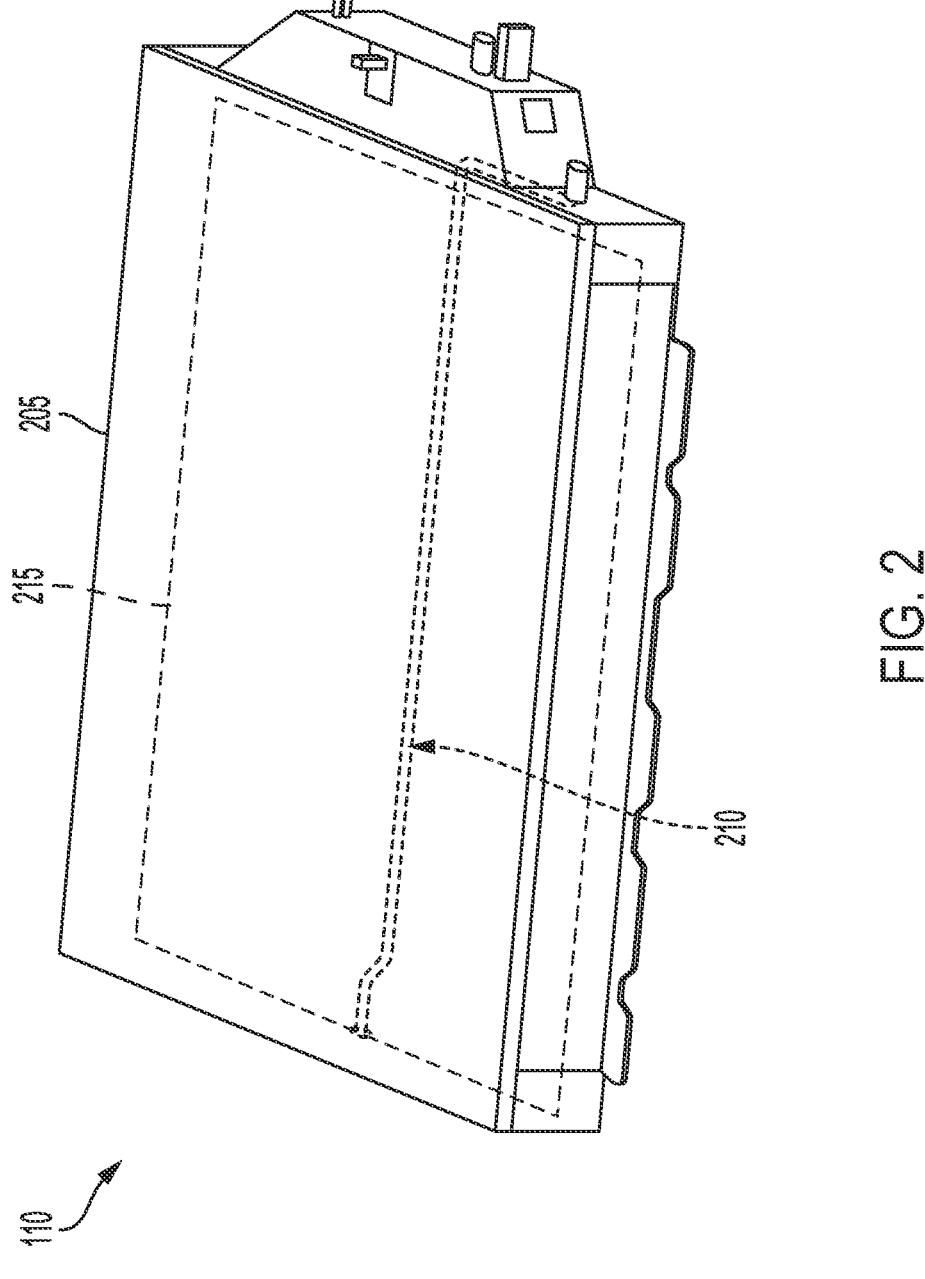
FIG. 2 depicts an example perspective view of a battery pack, in accordance with implementations.

FIG. 2 depicts an example battery pack 110. Referring to FIG. 2, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The battery module 115 can be or can include one or more groups of prismatic cells, cylindrical cells, pouch cells, or other form factors of battery cells 120. The housing 205 can include a shield on the bottom or underneath the battery module 115 to protect the battery module 115 and/or cells 120 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. The thermal component 215 can be positioned in relation to a top submodule and a bottom submodule, such as in between the top and bottom submodules, among other possibilities. The battery pack 110 can include any number of thermal components 215. For example, there can be one or more thermal components 215 per battery pack 110, or per battery module 115. At least one cooling line 210 can be coupled with, part of, or independent from the thermal component 215. One or more components of the battery pack 110 facilitate powering the vehicle 105 and therefore reducing or minimizing pressure or force applied to the battery pack 110 may be beneficial.

Figure 3:
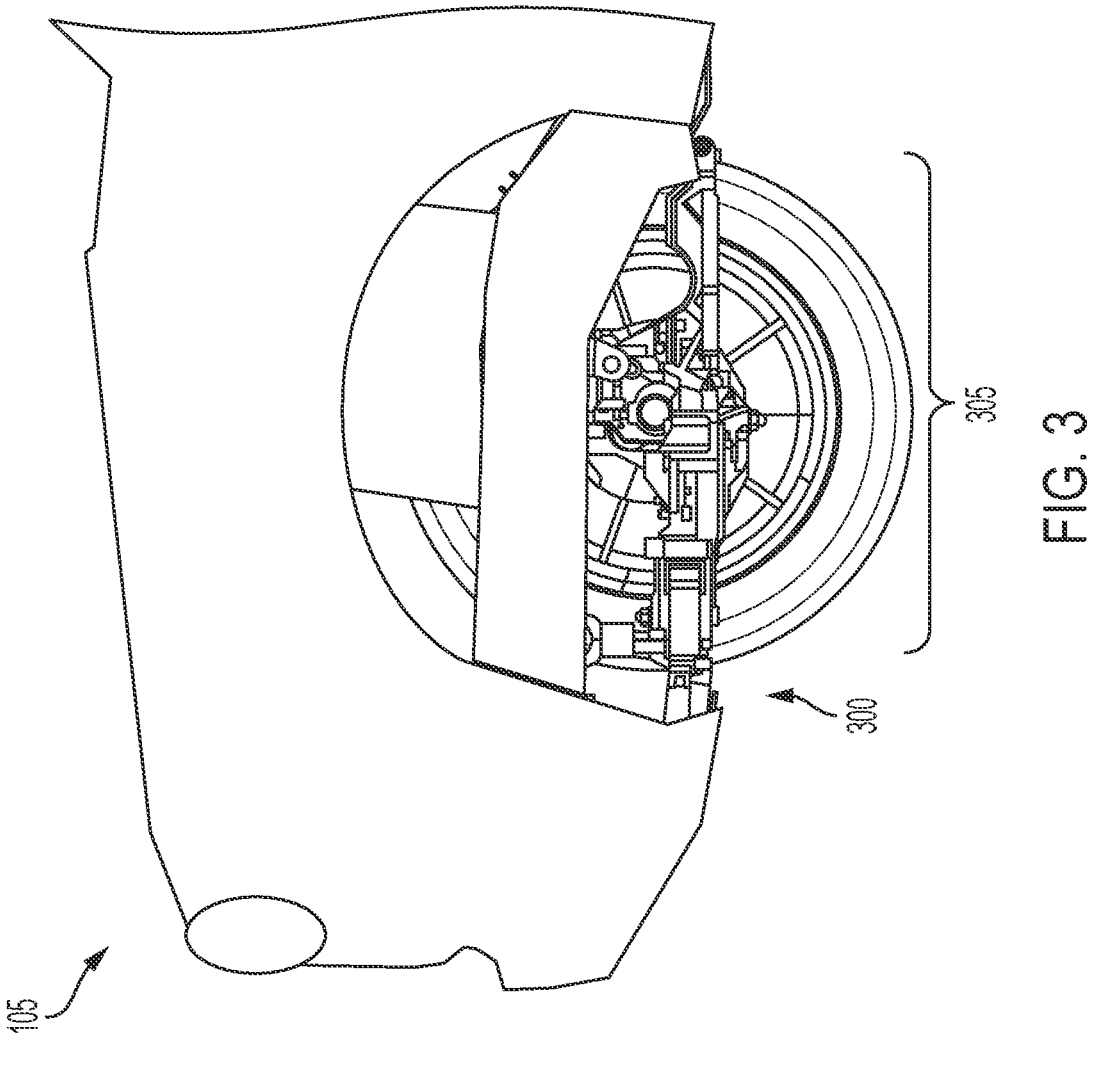
FIG. 3 depicts an example side view of a portion of the electric vehicle of FIG. 1 showing a subframe system, in accordance with implementations.

FIG. 3 depicts a side view of the vehicle 105, according to an example implementation. The vehicle 105 can include a subframe system 300. For example, the subframe system 300 can include various components that facilitate supporting the structure of the vehicle 105. As described herein, the subframe system 300 can include or can be a front subframe section 305 of the vehicle 105. In some examples, the subframe system 300 can include or can be a rear subframe section of the vehicle 105. For example, as the front subframe section 305, the subframe system 300 can be located near a front of the vehicle 105 (e.g., by the front wheels, extending across a portion of the vehicle 105). As a rear subframe section, the subframe system 300 can be located near a rear of the vehicle 105 (e.g., by the rear wheels, extending across a portion of the vehicle 105). The subframe section 305 can make up a portion of a full subframe of the vehicle 105, for example.

Figure 4:
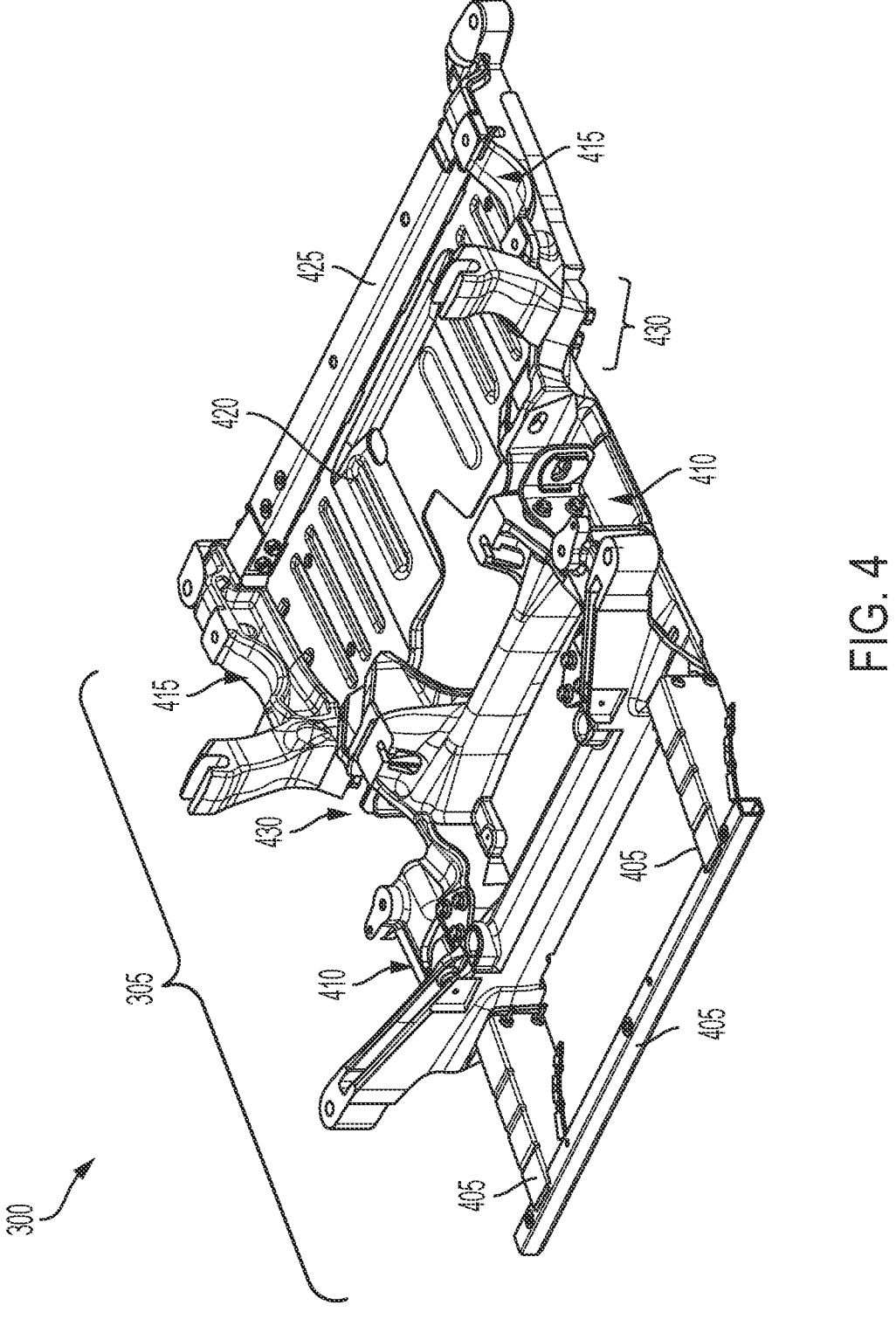
FIG. 4 depicts an example perspective view of the subframe system of the electric vehicle of FIGS. 1 and 3, in accordance with implementations.
Figure 5:
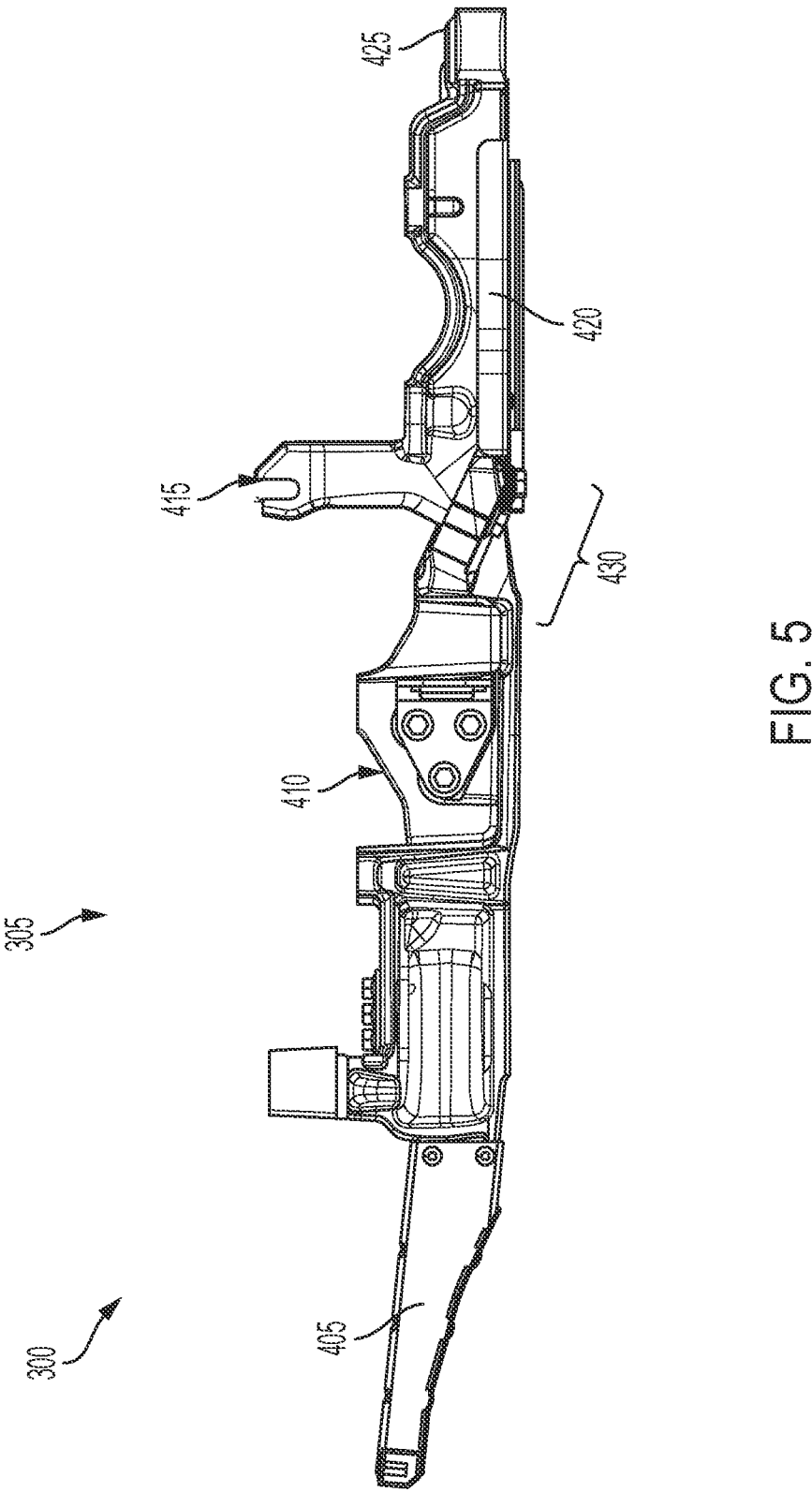
FIG. 5 depicts an example side view of the subframe system of FIG. 4, in accordance with implementations.

FIG. 4 depicts a perspective view of the subframe system 300 of the vehicle 105. FIG. 5 depicts a side view of the subframe system 300. For example, the subframe system 300 can include at least one subframe section 305. The subframe system 300 (e.g., the subframe section 305) can include at least one can 405. The cans 405 can include one or more members (e.g., beams, brackets, variously-shaped tubing) that can at least partially deform or absorb energy when force is applied to the can 405 directly or indirectly (e.g., a force applied to a frontal beam coupled with the cans 405).

The subframe system 300 (e.g., the subframe section 305) can include at least one first subframe portion 410 and at least one second subframe portion 415 (e.g., subframe portion). The first subframe portion 410 and the second subframe portion 415 can at least partially form the front subframe section 305 of the vehicle 105. For example, the first subframe portion 410 and the second subframe portion 415 can define a structure that couples to the vehicle 105 and supports various components of the vehicle 105 including, but not limited to, an engine, a steering rack, a battery pack, a drive unit, or a suspension. In some examples, the first subframe portion 410 can include the cans 405.

The first subframe portion 410 of the vehicle 105 can be located in front of the second subframe portion 415. For example, the first subframe portion 410 can be positioned in front of the second subframe portion 415 when the vehicle 105 is traveling in a forward direction of travel. The first subframe portion 410 of the vehicle 105 can be located behind the second subframe portion 415. For example, the second subframe portion 415 can be positioned in front of the first subframe portion 410 when the vehicle 105 is traveling in a forward direction of travel. The subframe section 305 can be located at a front end of the vehicle 105 (e.g., near an occupant) or at the rear end of the vehicle 105 (e.g., near a trunk or away from an occupant).

The first subframe portion 410 and the second subframe portion 415 can be made from various materials. For example, the first subframe portion 410 and the second subframe portion 415 can be made via casting using one or more types of aluminum. The first subframe portion 410 or the second subframe portion 415 can include one or more additional or alternative materials including various types of metal (e.g., steel, brass) or various types of non-metals (e.g., plastic, rubber).

The first subframe portion 410 can couple with the second subframe portion 415. For example, the first subframe portion 410 can couple with the second subframe portion 415 by one or more interface portions (e.g., joints, connections) 430. For example, the interface portions 430 can be or can include one or more components or spaces that couple a portion of the first subframe portion 410 with a portion of the second subframe portion 415, as described in greater detail herein. The interface portion 430 can include, but is not limited to, a portion of the first subframe portion 410, a portion of the second subframe portion 415, and various types of fasteners and corresponding holes, slots, or other openings that facilitate coupling the portion of the first subframe portion 410 with the portion of the second subframe portion 415. As described herein, the interface portion 430 can be or can include an angled interface portion 430.

The subframe system 300 can include two or more second subframe portions 415. For example, the subframe system 300 can include two second subframe portions 415 that oppose one another laterally relative to the subframe system 300. The two opposing second subframe portions 415 can couple with one another by a rear beam 425 (e.g., a beam, member, tubing, or other structure that extends at least partially between two second subframe portions 415 to couple the second subframe portions 415 together). The subframe system 300 can include one second subframe portion 415. For example, the rear beam 425 can couple with or be at least partially monolithically formed with the second subframe portions 415 such that the second subframe portion 415 defines one, continuous structure including the rear beam 425. While one side of the subframe system 300 is generally described herein (e.g., one angled interface portion 430 on one side of the subframe system 300), it should be understood that the subframe system 300 can include a plurality of angled interface portions 430. For example, the subframe system 300 can include two angled interface portions 430 positioned at opposing locations of the subframe system 300, as depicted in at least FIG. 4. The angled interface portions 430 can be substantially identical, or differ in size, shape, or configuration.

The subframe system 300 can include at least one shear plate 420. The shear plate 420 can couple with at least a portion of the first subframe portion 410 or at least a portion of the second subframe portion 415. The shear plate 420 can couple with the second subframe portion 415 in various ways. For example, the shear plate 420 can couple with the second subframe portion 415 by one or more fasteners, clamps, welding techniques, adhesives, or various other means. The shear plate 420 can additionally or alternatively couple with the first subframe portion 410 by one or more fasteners, clamps, welding techniques, adhesives, or various other means.

The shear plate 420 can couple with the first subframe portion 410 or the second subframe portion 415 at various positions. For example, the shear plate 420 can couple with the first subframe portion 410 at or near the angled interface portion 430 (e.g., by one or more fasteners 605, 620 as depicted in at least FIGS. 6 and 7). The shear plate 420 can couple with the second subframe portion 415 at or near the rear beam 425 of the subframe system 300 (e.g., by one or more fasteners, welded joints, clamps, or other means). As described herein, the shear plate 420 can couple with the first subframe portion 410 at a first portion of the shear plate and the second subframe portion 415 at a second portion of the shear plate. The shear plate 420 can bend in a direction from the first portion towards the second portion, as shown in at least FIG. 8.

The subframe system 300 can include various materials. As described herein, for example, the first subframe portion 410 and the second subframe portion 415 can be formed via casting using various metals, such as aluminum. The shear plate 420 can be formed using steel or another type of metallic material. For example, at least a portion of the shear plate 420 can include a higher strength (e.g., yield strength, ultimate tensile strength, or breaking strength) than at least a portion of the first subframe portion 410, the second subframe portion 415, or the angled interface portion 430.

Figure 6:
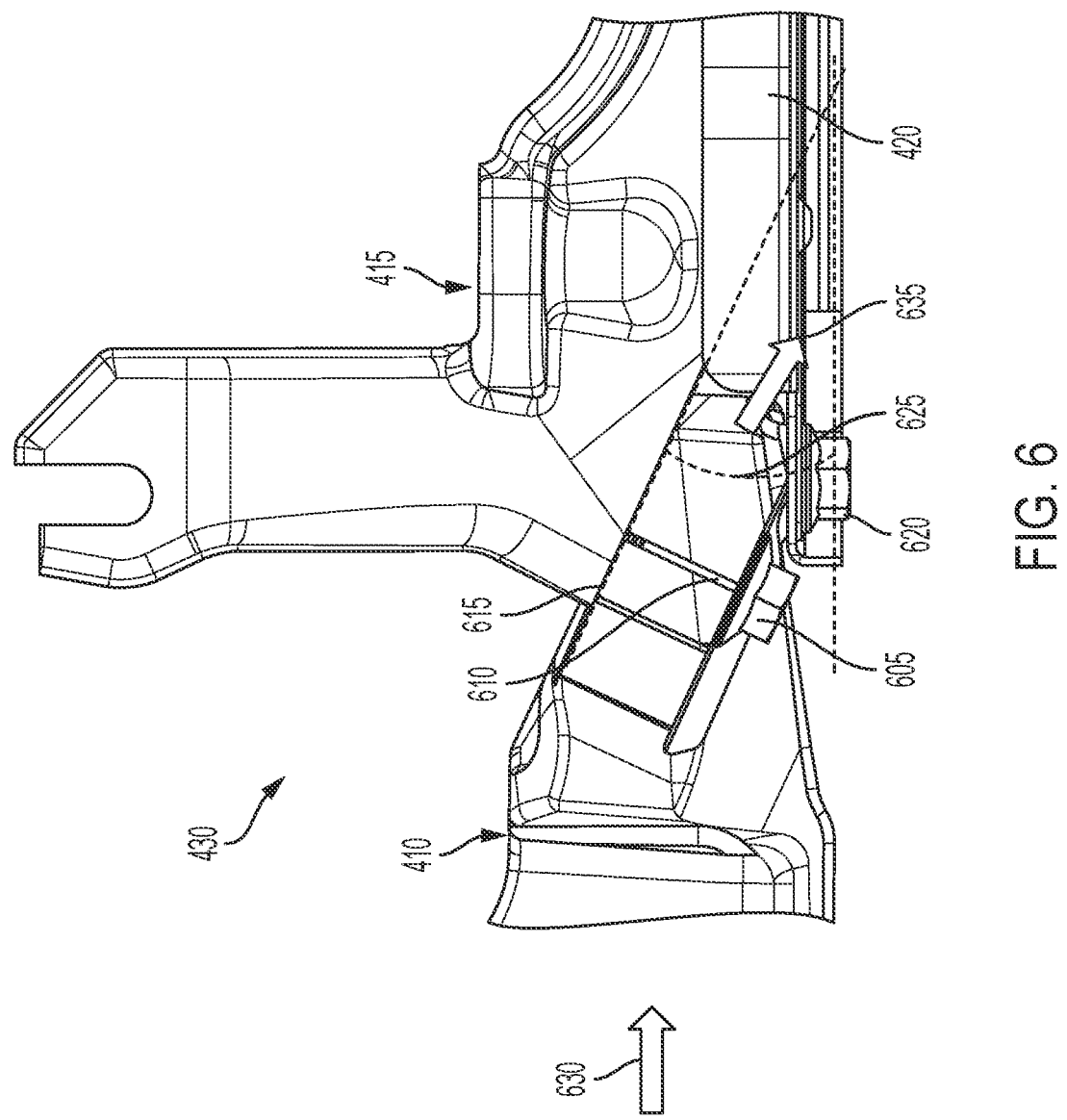
FIG. 6 depicts an example side view of a portion of the subframe system of FIG. 4, in accordance with implementations.
Figure 7:
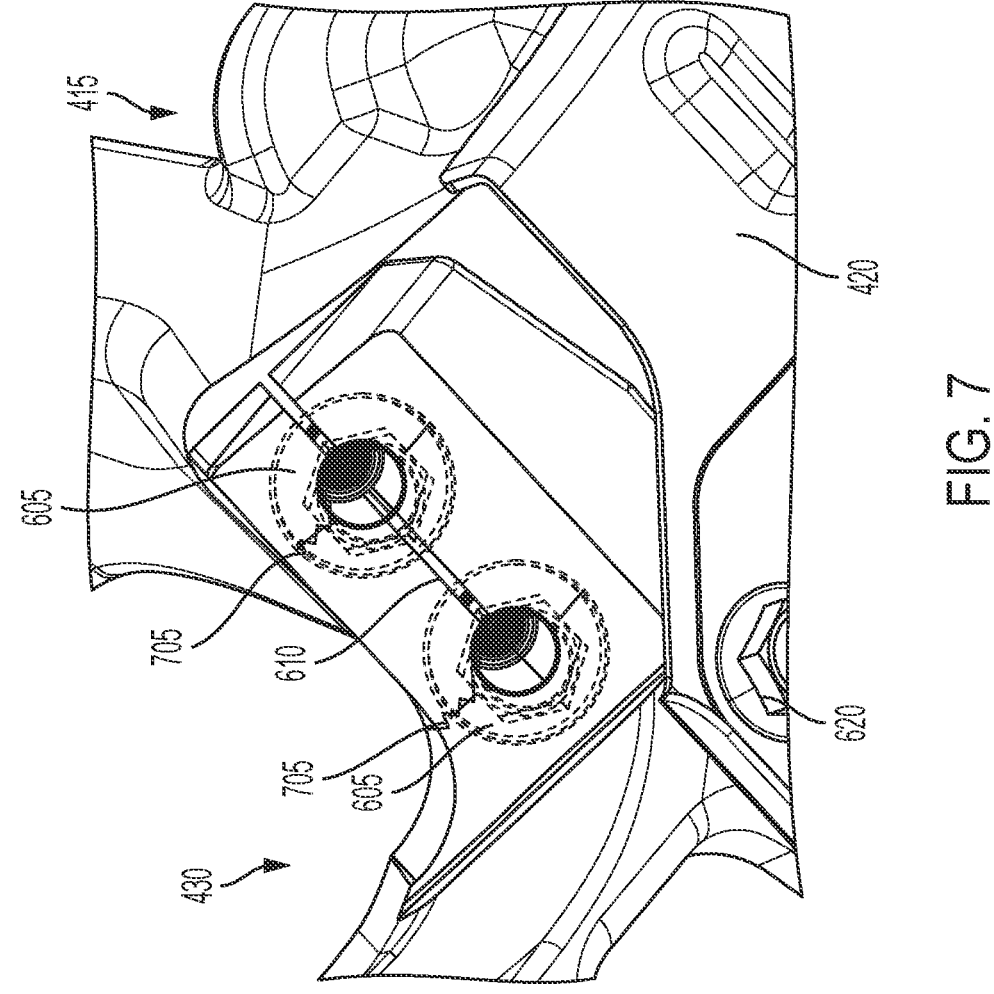
FIG. 7 depicts an example bottom perspective view of a portion of the subframe system of FIG. 4, in accordance with implementations.

FIG. 6 depicts an enlarged side view of a portion of the subframe system 300. For example, FIG. 6 depicts an enlarged view of one of the angled interface portions 430 of the subframe system 300. FIG. 7 depicts a bottom perspective view of the angled interface portion 430. As described herein, the angled interface portion 430 can couple the first subframe portion 410 with the second subframe portion 415.

The angled interface portion 430 can include at least one fastener 605 that facilitates coupling the first subframe portion 410 with the second subframe portion 415. For example, the angled interface portion 430 can include two fasteners 605, as depicted in at least FIG. 7. The angled interface portion 430 can include three fasteners (e.g., fasteners 605 and 620). The fasteners 605, 620 can be or can include various types of fasteners, such as a bolt or screw. As depicted in FIGS. 6 and 7, and among others, the fasteners 605 can extend through at least a portion of the first subframe portion 410 and at least a portion of the second subframe portion 415 to couple the subframes together. For example, the fasteners 605 can extend through a through hole of the first subframe portion 410 and engage with a portion of the second subframe portion 415 to fix the subframes together. As another example, the fasteners 605 can extend through a through hole of the second subframe portion 415 and engage with a portion of the first subframe portion 410 to fix the subframes together. The angled interface portion 430 can include at least one through hole for the fasteners 605, for example.

The angled interface portion 430 (e.g., a portion of the first subframe portion 410, a portion of the second subframe portion 415, or another component coupled with the first subframe portion 410 or second subframe portion 415) can include at least one mechanical fuse 610. The mechanical fuse 610 can facilitate causing the angled interface portion 430 to at least partially yield (e.g., deform, break, crack, bend, snap, open, or otherwise move such that the first subframe portion 410 can at least partially decouple from the second subframe portion 415 due to the mechanical weakness of the mechanical fuse 610). For example, the mechanical fuse 610 can cause the first subframe portion 410 to at least partially break away, completely break away, or be disjointed from the second subframe portion 415 by a certain amount (e.g., greater than or equal to 10%).

The mechanical fuse 610 can facilitate causing the angled interface portion 430 to at least partially yield (e.g., deform, break, crack, bend, snap, open, or otherwise move such that the first subframe portion 410 can at least partially decouple from the second subframe portion 415 due to the mechanical weakness of the mechanical fuse 610) in response to a threshold force. For example, the mechanical fuse 610 can include a discontinuation in a portion of the angled interface portion 430 (e.g., a slot, opening, aperture, or other discontinuation in one or more of the first subframe portion 410, second subframe portion 415, or another component of the angled interface portion 430).

The mechanical fuse 610 (e.g., a discontinuation, a slot), for example, can facilitate linking a portion of the first subframe portion 410 and a portion of the second subframe portion 415 together in yieldable engagement and can permit separation when a force applied to one or more of the components exceeds a threshold value. For example, the mechanical fuse 610 can include a discontinuation in a portion of the angled interface portion 430 (e.g., a slot, opening, aperture, or other discontinuation in one or more of the first subframe portion 410, second subframe portion 415, or another component of the angled interface portion 430). As described herein, the mechanical fuse 610 can include a slot or other discontinuation positioned at a through hole of a fastener (e.g. fastener 605) that can cause a portion of the interface portion 430 to deform or break in response to a threshold force. For example, as described herein, the discontinuation can facilitate causing one or more openings or holes for the fasteners 605 to break (e.g., at a break point 705).

The angled interface portion 430 can include at least one interface 615 between a portion of the first subframe portion 410 and a portion of the second subframe portion 415. For example, the interface 615 can include one or more points or surfaces of contact (directly or indirectly) between the first subframe portion 410 and the second subframe portion 415. The interface 615 can be angled such that a portion of the first subframe portion 410 (e.g., a surface of the first subframe portion 410) is angled relative to a portion of the second subframe portion 415 (e.g., a surface of the second subframe portion 415). For example, the surfaces of the first subframe portion 410 and the second subframe portion 415 can interface and oppose one another along the angled interface 615, as depicted in at least FIG. 6.

The angle 625 of the interface 615 (e.g., an angle defined between a plane cutting through the interface 615, or the interface itself, and the horizontal or a horizontal plane extending along, for example, the shear plate 420) can be in the range of 10-45 degrees relative to the horizontal. The angle 625 can be in the range of 15-35 degrees. The angle 625 can be in the range of 20-30 degrees. For example, the angle 625 can be 25 degrees.

Figure 8:
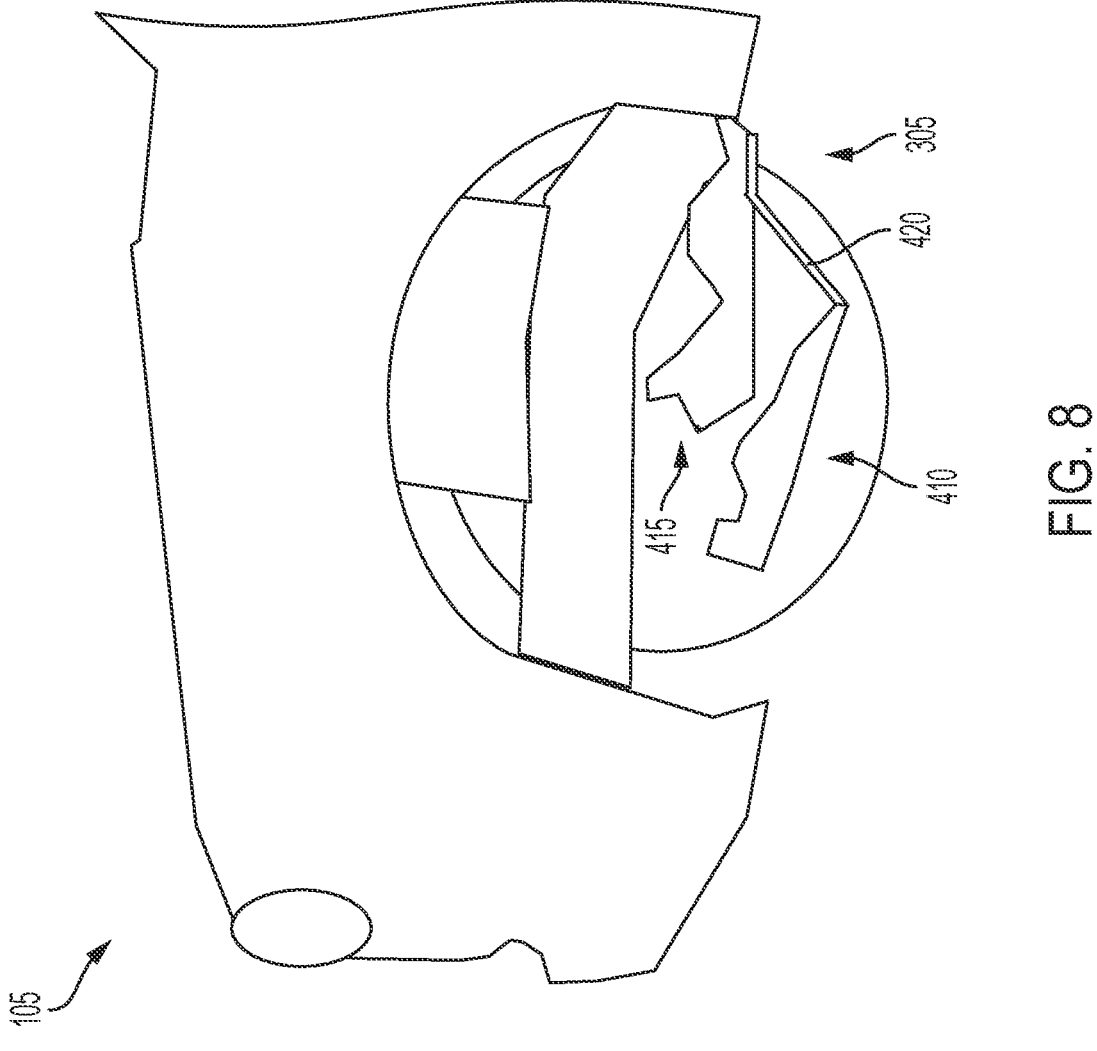
FIG. 8 depicts an example side view of a portion of the subframe system of FIG. 4 in a moved state, in accordance with implementations.

FIG. 8 depicts a side view of the subframe system 300 of the vehicle 105 in a moved state. For example, FIG. 8 depicts the subframe system 300 during or after a force (e.g., a threshold force) is applied to a portion of the subframe system 300 (e.g., to a portion of the first subframe portion 410). It should be understood that other parts of the vehicle 105 or the subframe system 300 can move or deform based on the threshold force, which may not necessarily be represented in FIG. 8.

Referring to FIGS. 6-8, among others, the angle 625 of the interface 615 (e.g., the slope) can facilitate guiding the first subframe portion 410 at a downward angle relative to the second subframe portion 415 (e.g., towards the second subframe portion 415) when the mechanical fuse 610 causes the angled interface portion 430 to at least partially yield (e.g., when a threshold force is applied to the first subframe portion 410). For example, when a threshold force is applied in a direction substantially parallel with the horizontal plane and at an angle to the interface portion 430, generally in the direction of arrow 630 (±90 degrees in any direction in three dimensions), the mechanical fuse 610 can allow a portion of the angled interface portion 430 to yield (e.g., at one or more of the break points 705 depicted in at least FIG. 7), allowing at least a portion of the first subframe portion 410, up to an entirety of the first subframe portion 410, to separate from the second subframe portion 415 (e.g., such that they are no longer rigidly fixed). For example, one or more break points 705 of the angled interface portion 430 can be located at or near a through hole for a fastener 605 of the angled interface portion 430. The break points 705 can be, for example, positioned on a side of the through holes that are closer to a front of the vehicle 105 than the rear of the vehicle 105.

The angle 625 of the interface 615 between the first subframe portion 410 and the second subframe portion 415 can cause the first subframe portion 410 to move in a downward direction relative to the second subframe portion 415 (e.g., as generally shown by arrow 635, ±45 degrees in any direction). For example, a surface of the first subframe portion 410 at the interface 615 can apply a force to a surface of the second subframe portion 415 at the interface 615 which can cause the first subframe portion 410 to move in the downward direction. The first subframe portion 410 can move, for example, such that the second subframe portion 415 at least partially overlaps the first subframe portion 410 for a period of time. For example, the first subframe portion 410 can move downward such that a portion (e.g., 10%, 20%, 30%, or another portion) can be positioned directly beneath the second subframe portion 415 in a direction from a topmost portion of the vehicle 105 towards a bottommost portion (e.g., towards the wheels or ground). In other words, in a top-down direction, at least a portion of the first subframe portion 410 can be positioned beneath a portion of the second subframe portion 415 (e.g., at or near the shear plate 420) such that a portion of the first subframe portion 410 is hidden from view in a top-down direction.

As described herein, a portion of the shear plate 420 can couple with the first subframe portion 410 at or near the angled interface portion 430 (e.g., by a fastener 620) and another portion of the shear plate 420 can couple with the second subframe portion 415 at or near the rear beam 425. When the threshold force is applied and the first subframe portion 410 begins to move in a downward direction, at least a portion of the shear plate 420 can deform. For example, as depicted in at least FIG. 8, the shear plate 420 can bend in a direction that the first subframe portion 410 moves. The shear plate 420 can bend without breaking apart, for example.

The separation (e.g., decoupling) and movement of the first subframe portion 410 relative to the second subframe portion 415 can allow for more space provided at or near a portion of the vehicle 105 (e.g., a front, a rear, or a side). For example, the first subframe portion 410 can be displaced a distance relative to a starting position of the first subframe portion 410 (e.g., 1 mm, 10 mm, 100 mm, 10 m, or another distance). The front, rear, or side portion of the vehicle 105 can include more open space about equal to the displacement of the first subframe portion 410. In other words, the movement and separation of the first subframe portion 410 relative to the second subframe portion 415 can reduce an overall length of the subframe system 300 relative to a length of the vehicle 105.

Movement of the first subframe portion 410 relative to the second subframe portion 415 can allow for movement of other components within the subframe system 300 or another portion of the vehicle 105. For example, the movement of the first subframe portion 410 can allow a drive unit and steering rack of the vehicle to move towards the second subframe portion 415 and in a downward direction. Movement of these components together with the first subframe portion 410 can reduce the amount of rigid components positioned at a certain distance away from an exterior of the vehicle 105 (e.g., in a direction from a center interior position of the vehicle towards the arrow 630).

Movement of the first subframe portion 410 can facilitate reducing a force applied to a battery pack 110 of the vehicle 105. For example, the angle 625 of the interface 615 can facilitate causing the first subframe portion 410 to shift or move in a direction such that the first subframe portion 410 moves at least partially away from the battery pack 110 of the vehicle 105.

Figure 9:
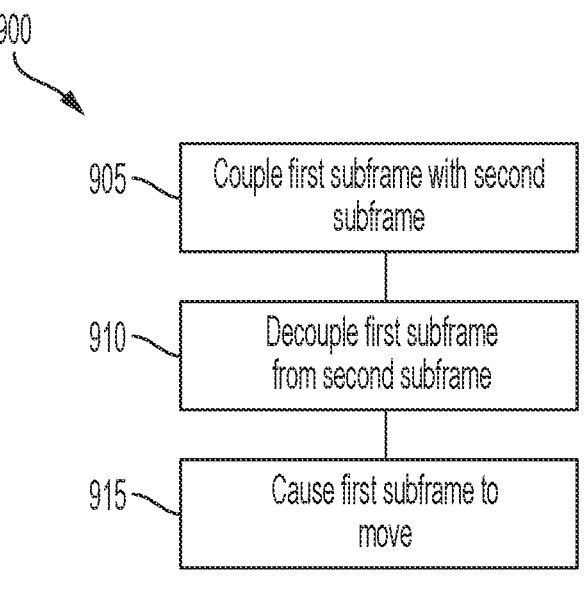
FIG. 9 depicts an illustration of a process, in accordance with implementations.

FIG. 9 depicts an illustration of a method 900, according to an example implementation. The method 900 can include coupling the first subframe portion 410 with the second subframe portion 415, as depicted in act 905. For example, the first subframe portion 410 can couple with the second subframe portion 415 through the angled interface portion 430. The angled interface portion 430 can include at least one fastener 605 that facilitates coupling the first subframe portion 410 with the second subframe portion 415. For example, the angled interface portion 430 can include two or more fasteners 605. The fasteners 605 can be or can include various types of fasteners, such as a bolt or screw. The fasteners 605 can extend through at least a portion of the first subframe portion 410 and at least a portion of the second subframe portion 415 to couple the subframes together. The angled interface portion 430 can include at least one through hole for the fasteners 605, for example.

The method 900 can include decoupling the first subframe portion 410 from the second subframe portion 415, as depicted in act 910. The angled interface portion 430 can include at least one mechanical fuse 610 which can facilitate causing the angled interface portion 430 to at least partially separate (e.g., deform, break, crack, bend, snap, open, or otherwise move such that the first subframe portion 410 can at least partially separate from the second subframe portion 415 due to the mechanical weakness of the mechanical fuse 610). For example, the mechanical fuse 610 can include a discontinuation in a portion of the angled interface portion 430 (e.g., a slot, opening, aperture, or other discontinuation in one or more of the first subframe portion 410, second subframe portion 415, or another component of the angled interface portion 430) that yields at a predetermined threshold force but remains intact below the threshold force.

The method 900 can include causing the first subframe portion 410 to at least partially move, as depicted in act 915. For example, the angled interface portion 430 can include at least one interface 615 between a portion of the first subframe portion 410 and a portion of the second subframe portion 415. For example, the interface 615 can include one or more points or surfaces of contact between the first subframe portion 410 and the second subframe portion 415. The interface 615 can be angled such that a portion of the first subframe portion 410 (e.g., a surface of the first subframe portion 410) is angled relative to a portion of the second subframe portion 415 (e.g., a surface of the second subframe portion 415). For example, the surfaces of the first subframe portion 410 and the second subframe portion 415 can interface and oppose one another along the angled interface 615. The angle 625 of the interface 615 can cause the first subframe portion 410 to move in a downwards direction with the application of the threshold force such that at least a portion of the second subframe portion 415 overlaps the first subframe portion 410.

The subframe system 300 can include at least one shear plate 420 coupled with the first subframe portion 410 and the second subframe portion 415. When the threshold force is applied and the first subframe portion 410 begins to move in a downward direction, at least a portion of the shear plate 420 can deform. For example, the shear plate 420 can bend in a direction that the first subframe portion 410 moves. The shear plate 420 can bend without breaking or cracking, for example.

Figure 10:
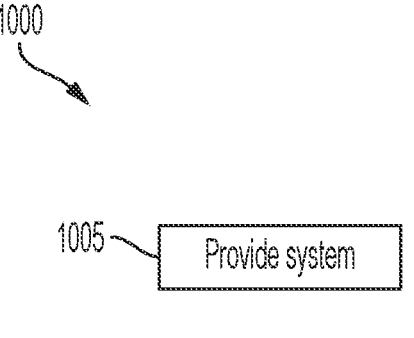
FIG. 10 depicts an illustration of a process, in accordance with implementations.

FIG. 10 depicts an illustration of a method 1000, according to an example implementation. The method 1000 can include providing the subframe system 300, as depicted in act 1005. For example, the subframe system 300 can include at least one first subframe portion 410 and at least one second subframe portion 415. The first subframe portion 410 can be positioned in front of or behind the second subframe portion 415.

The first subframe portion 410 can couple with the second subframe portion 415 such that the subframes are at least partially rigidly connected to one another. For example, the first subframe portion 410 can couple with the second subframe portion 415 by one or more angled interface portions 430. The angled interface portion 430 can include at least one fastener 605 that facilitates coupling the first subframe portion 410 with the second subframe portion 415. The angled interface portion 430 (e.g., a portion of the first subframe portion 410, a portion of the second subframe portion 415, or another component coupled with the first subframe portion 410 or second subframe portion 415) can include at least one mechanical fuse 610. The mechanical fuse 610 can facilitate causing the angled interface portion 430 to at least partially yield (e.g., deform, break, crack, bend, snap, open, or otherwise move such that the first subframe portion 410 can at least partially separate from the second subframe portion 415 due to the mechanical weakness of the mechanical fuse 610) in response to the threshold force. For example, the mechanical fuse 610 can include a discontinuation in a portion of the angled interface portion 430 (e.g., a slot, opening, aperture, or other discontinuation in one or more of the first subframe portion 410, second subframe portion 415, or another component of the angled interface portion 430). The discontinuation can facilitate causing one or more openings or holes for the fasteners 605 to break (e.g., at the break point 705).

The angled interface portion 430 can include at least one interface 615 between a portion of the first subframe portion 410 and a portion of the second subframe portion 415. For example, the interface 615 can include one or more points or surfaces of contact (directly or indirectly) between the first subframe portion 410 and the second subframe portion 415. The interface 615 can be angled such that a portion of the first subframe portion 410 (e.g., a surface of the first subframe portion 410) is angled relative to a portion of the second subframe portion 415 (e.g., a surface of the second subframe portion 415). For example, the surfaces of the first subframe portion 410 and the second subframe portion 415 can interface and oppose one another along the angled interface 615.

The interface 615 (e.g., the angle 625 of the interface) can facilitate guiding the first subframe portion 410 at a downward angle relative to the second subframe portion 415 when the mechanical fuse 610 causes the angled interface portion 430 to yield. For example, when a threshold force is applied, the mechanical fuse 610 can cause a portion of the angled interface portion 430 to break or crack (e.g., along the one or more break points 705), allowing at least a portion of the first subframe to separate from the second subframe portion 415. The angle 625 of the interface 615 between the first subframe portion 410 and the second subframe portion 415 can cause the first subframe portion 410 to move in a downward direction relative to the second subframe portion 415. For example, a surface of the first subframe portion 410 at the interface 615 can apply a force to a surface of the second subframe portion 415 at the interface 615 which can cause the first subframe portion 410 to move in the downward direction. The first subframe portion 410 can move, for example, such that the second subframe at least partially overlaps the first subframe portion 410 for a period of time.

When the threshold force is applied and the first subframe portion 410 begins to move in a downward direction, at least a portion of the shear plate 420 can deform. For example, the shear plate 420 can bend in a direction that the first subframe portion 410 moves. The shear plate 420 can bend without breaking or cracking, for example.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. For example, the first and second subframes can be reversed such that a force applied to the second subframe causes the second subframe to move relative to the first subframe. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
a subframe section having a first subframe portion and a second subframe portion;
a shear plate coupled with the first subframe portion, the shear plate to bend in response to movement of the first subframe portion;
the second subframe portion coupled with the first subframe portion at an angled interface having an angle relative to a horizontal plane; and
the angled interface configured to decouple the first subframe portion from the second subframe portion and cause the first subframe portion to move in a direction towards the second subframe portion based on the angle of the angled interface in response to a threshold force applied to the first subframe portion.

2. The system of claim 1, comprising:
the angle of the angled interface is in the range of 10 to 45 degrees.

3. The system of claim 1, comprising:
the first subframe portion to move in response to the threshold force such that at least a portion of the second subframe portion overlaps the first subframe portion.

4. The system of claim 1, comprising:
a second portion of the shear plate coupled with the second subframe portion.

5. The system of claim 1, comprising:
the angled interface including a discontinuation configured to cause a portion of the angled interface to deform or break in response to the threshold force.

6. The system of claim 1, comprising:
the angled interface including a through hole of a fastener, and a slot positioned at the through hole that extends along a portion of the angled interface configured to cause a portion of the angled interface to deform or break in response to the threshold force.

7. The system of claim 1, comprising:
the threshold force applied parallel to the horizontal plane and angled relative to the angled interface.

8. An electric vehicle, comprising:
a subframe section having a first subframe portion and a second subframe portion;
a shear plate coupled with the first subframe portion, the shear plate to bend in response to movement of the first subframe portion;
the second subframe portion coupled with the first subframe portion at an angled interface having an angle relative to a horizontal plane; and
the angled interface configured to decouple the first subframe portion from the second subframe portion and cause the first subframe portion to move in a direction towards the second subframe portion based on the angle of the angled interface in response to a threshold force applied to the first subframe portion.

9. The electric vehicle of claim 8, comprising:
the angle of the angled interface is in the range of 10 to 45 degrees.

10. The electric vehicle of claim 8, comprising:
the first subframe portion to move in response to the threshold force such that at least a portion of the second subframe portion overlaps the first subframe portion.

11. The electric vehicle of claim 8, comprising:
a second portion of the shear plate coupled with the second subframe portion.

12. The electric vehicle of claim 8, comprising:
the angled interface including a discontinuation configured to cause a portion of the angled interface to deform or break in response to the threshold force.

13. The electric vehicle of claim 8, comprising:
the angled interface including a through hole of a fastener, and a slot positioned at the through hole that extends along a portion of the angled interface configured to cause a portion of the angled interface to deform or break in response to the threshold force.

14. The electric vehicle of claim 8, comprising:
the threshold force applied parallel to the horizontal plane and angled relative to the angled interface.

15. A method, comprising:
coupling a first subframe portion of a subframe section with a second subframe portion of the subframe section at an angled interface having an angle relative to a horizontal plane;
coupling a shear plate with the first subframe portion, the shear plate to bend in response to movement of the first subframe portion;
decoupling the first subframe portion from the second subframe portion at the angled interface in response to a threshold force applied to the first subframe portion; and
causing the first subframe portion to move in a direction towards the second subframe portion based on the angle of the angled interface in response to the threshold force applied to the first subframe portion.

16. The method of claim 15, comprising:
the angle of the angled interface is in the range of 10 to 45 degrees.

17. The method of claim 15, comprising:
the first subframe portion to move in response to the threshold force such that at least a portion of the second subframe portion overlaps the first subframe portion.

18. The method of claim 15, comprising:
a second portion of the shear plate coupled with the second subframe portion.

19. The method of claim 15, comprising:
the angled interface including a discontinuation configured to cause a portion of the angled interface to deform or break in response to the threshold force.

20. The method of claim 15, comprising:
the angled interface including a through hole of a fastener, and a slot positioned at the through hole that extends along a portion of the angled interface configured to cause a portion of the angled interface to deform or break in response to the threshold force.

* * * * *